INVENTOR.
CONRAD H. BIBER

BY Brown and Mikulka
and
Gerald L. Smith
ATTORNEYS

United States Patent Office 3,610,122
Patented Oct. 5, 1971

3,610,122
SHUTTER TIMING SYSTEM
Conrad H. Biber, Needham, Mass., assignor to
Polaroid Corporation, Cambridge, Mass.
Filed Mar. 5, 1969, Ser. No. 804,395
Int. Cl. G03b 9/62, 9/70, 7/08
U.S. Cl. 95—10 C                    26 Claims

ABSTRACT OF THE DISCLOSURE

An exposure control system for regulating the exposure interval of a camera in cooperation with flash units, particularly those of the electronic or strobe variety. The system utilizes two battery power sources, one to power the lighting unit and the other to power the shutter interval timing circuit. The response of the timing circuit is adjusted by selectively inserting an electric signal from the lighting unit battery source into the shutter timing circuit. A diode is used to isolate the timing circuit from the electronic flash circuit when the latter is not being utilized.

---

The present invention relates to control of the duration of photographic exposures and, more particularly, to a photographic exposure control system for automatically controlling an exposure interval in cooperation with the use of transient scene illumination.

BACKGROUND OF THE INVENTION

Automated photographic exposure control systems typically are configured combining a light sensitive timing network and a voltage sensitive triggering circuit or the like in controlling relationship with a shutter assembly. The timing networks are generally formed as R–C networks, the resistance of which is constituted by a photosensitive device such as a photoconductive element whose resistance is functionally related to the level of brightness of a scene to which the element is exposed. When the R–C network is activated substantially at the same time that a shutter mechanism is caused to uncover an exposure aperture, it generates a trigger signal voltage within a period of time dependent upon the capacitance of the network and the resistance of the element as established by the level of scene brightness. The triggering circuit used in conjunction with the R–C network is of a voltage sensitive variety and is arranged for response to the voltage generated by the R–C network such that it causes the shutter mechanism to cover the exposure aperture when the signal voltage reaches the predetermined trigger voltage level. The actual exposure time, therefore, is established as the time required by the R–C network, after activation, to generate the predetermined triggering signal voltage.

When scene illumination as derived from flashbulbs or from electronic flash devices, sometimes referred to as "strobe" units, is used with the automatic exposure control systems, corrective arrangements are needed to accommodate for the transient nature of the lighting. For instance, where electronic flash units are utilized with the automated systems, the interval of flash is very short. For some photographic situations, the photosensitive elements of the timing circuits will have response rates or rise time characteristics unable to react sufficiently to the shortened light pulse interval. As a consequence, auxiliary means are required for closing the shutter following the energization of the artificial lighting unit.

It is desirable, however, to provide for a degree of latitude in the contribution of any auxiliary timing means as used in adjusting the control systems for artificial illumination. Where ambient lighting is relatively low in intensity and the surround of the photographic subject is somewhat nonreflective, the auxiliary controlling arrangement should assume control of the exposure system and cause the termination of exposure at least after a select interval following the firing of the flash unit. In other photographic situations requiring flash illumination, it is desirable that the automatic exposure control systems function to provide some degree of scene light evaluation. For example, the control systems should be capable of operating in a "fill-in flash" mode in which ambient light levels are relatively high, but portions of the photographic subject are relatively dark and require supplementary illumination. For this lighting situation, it is preferred that the exposure interval be controlled entirely from the light sensitive timing network.

In another often encountered situation, a photographic subject will be positioned under relatively low ambient lighting but within a highly reflective environment or surround. In such situations, shorter intervals of exposure are desired and conventional photosensing devices are capable of adequately reacting to flash illumination reflecting from the environment to provide this shorter interval. Accordingly, the photosensitive timing network of the control systems should be capable of contributing to exposure evaluation under such conditions.

From the foregoing it may be seen that a selective cooperation is desired between the artificial illuminating unit of a camera and its automatic exposure interval control system. However, it is also desirable that the artificial illuminating function be somewhat isolated from the operation of the control system. Such isolation provides for a diminishment of interferring noise levels which may otherwise disrupt operation of the sensitive timing or triggering networks.

SUMMARY OF THE INVENTION

The present invention provides an automatic exposure control system operable with artificial scene illuminating units including those of the electronic flash variety capable of providing illumination in pulses of very short interval. The system retains a capability for either full or partial control by a conventional photoresponsive timing circuit over a flash exposure interval. With such a control arrangement, an operational flexibility is realized which permits an accommodation of the exposure control system to a relatively broad variety of photographic situations requiring flash illumination.

The exposure control system of the invention provides for the selective insertion of a signal into the light sensitive timing network of a shutter control arrangement which functions, under conditions of relatively low ambient scene illumination and conditions of low scene environmental reflectivity, to limit the duration of a photographic exposure to a select interval. Where scenes representing relatively high environmental reflection characteristics are encountered, the exposure control system of the invention retains a capability of providing control over exposure interval which is exerted substantially by the photosensing timing network of the system. Where photographic situations requiring a "fill-in flash" form of illumination are encountered, the exposure control system is capable of providing full control over the regulation of exposure interval by its photosensitive timing network.

The exposure control system of the invention is characterized in the use of two power supplies, one of which is mountable in power supply relationship with a photographic illuminating device such as an electronic flash unit. The other power supply is mounted within a photographic camera and is coupled, inter alia, for supplying electrical energy to the exposure interval timing network of the camera. The control system includes conductor means selectively coupled between the illuminating unit power supply and the light sensitive timing network which functions to insert a D.C. signal of select value into the timing network during a flash illuminated exposure. The aforesaid coupling conductor means also includes a unidirectional conducting unit such as a diode which functions to isolate the coupling conductor from the photosensitive timing network during periods when no signal is being introduced from the illuminating unit.

In a preferred embodiment of the invention, switching means are provided in conjunction with an electronic flash illuminating unit power supply which permit the unit to be charged for firing while isolating the power supply from the exposure control system timing network. With such an arrangement, a "fill-in flash" operational mode is provided by the system.

The reliability of the entire exposure control system is enhanced through the use of the two sources of power. For instance, the timing network function of the camera may continue to operate for normal outdoor photography even though the power supply for the illuminating unit may be exhausted, the diode inserted in the coupling conductor functioning to isolate the operation of the timing network during periods of nonuse of artificial illumination.

Another object of the instant invention is to provide novel means which serve to reduce or eliminate errors in the duration of exposures effected by photographic shutters under the control of a light sensitive timing means.

It is a further object to provide means selectively operable to advance termination of the exposure timing interval of a photographic shutter so as to permit its operation with transient illumination under scene conditions representing relatively low ambient light levels and low photographic subject environmental reflection characteristics.

Other objects of the invention will in part be obvious and will in part appear hereinafter.

The invention accordingly comprises the system and apparatus possessing the features, technique and properties which are exemplified in the description to follow hereinafter and the scope of the application will be indicated in the appended claims.

BRIEF DESCRIPTION OF THE DRAWINGS

FIG. 3 is a graphical representation of the voltage levels derived in the timing network of the present invention under various conditions of scene illumination.

DETAILED DESCRIPTION

The present exposure control system is operative to insert a selective regulation function into an automatic shutter control arrangement during camera operations requiring illumination from a flash device. While operable with a variety of separately powered flash units, the system is particularly useful when operated in conjunction with artificial illuminating units of the flash discharge variety. The battery supply of such an illuminating unit is utilized by the instant control system for developing a signal functioning to selectively adjust a shutter timing or closing function. In a convenient arrangement of the system, the camera assembly may be automatically armed for such modified flash operation concurrently with the coupling of a flash unit to the body of the camera. An appropriate arrangement for effecting such mechanical and electrical simultaneous coupling between the camera housing and an electronic flash unit is described in detail in a copending United States application for patent entitled "Electronic Flash Unit," filed June 29, 1970, Ser. No. 56,079, by Reed et al. and assigned in common herewith.

Figure 1:
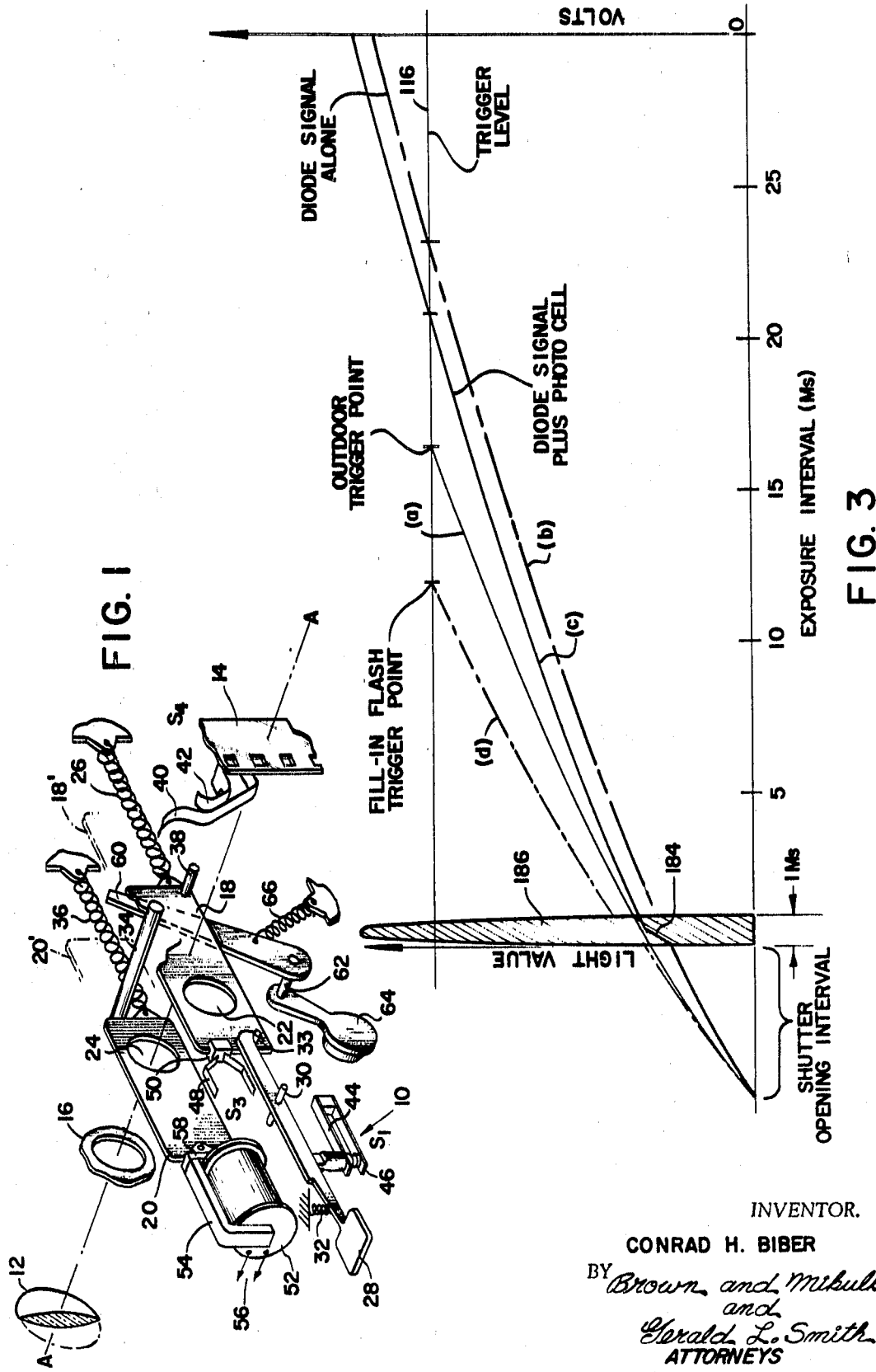
FIG. 1 is a schematic representation of a camera having shutter means which may function with the exposure control system of the present invention.

A shutter mechanism which may be controlled by the circuit embodiment to be described is portrayed in FIG. 1. The shutter assembly 10 is mounted within a shutter housing for operation in conjunction with the optical path of a camera, the axis of which is depicted by line A—A. Included within the optical path is a lens 12 for receiving light from a scene being photographed and focusing it upon a photosensitive material 14. Between the lens 12 and shutter assembly 10 there is provided an exposure aperture 16 which may take the form of a disc mounted upon the shutter housing. In the embodiment shown, the aperture 16 is preselected, however, its relative area may be determined through fully or semiautomatic means in accordance with an exposure program. The shutter assembly 10 contemplated for the instant embodiment is of a variety wherein exposure is initiated by the actuation of a shutter opening blade. During the interval of an exposure, a second or closing shutter blade is retained in a retracted position by an electromagnet. The closing blade is released to terminate an exposure interval by the action of a combined light sensing timing circuit and a voltage sensitive triggering circuit which function to regulate the energization of the electromagnet. The opening and closing blades of the assembly 10 are depicted respectively in the figure as the pair of planar, opaque blades 18 and 20. Each of the blades 18 and 20 is provided respectively with an exposure orifice as at 22 and 24. Blades 18 and 20 are mounted in tracks (not shown) so as to be normal to the optical axis A—A and reciprocable between terminal positions intersecting the axis. Each of the blades has one terminal position at which its solid portion overlies and totally occludes the passage of light through exposure aperture 16, and another terminal position at which its exposure orifice is aligned with the exposure aperture so as to permit the passage of light through the optical path. These blade orientations are referred to respectively as "blocking" and "unblocking" positions. In the solid portions of the illustration, the blades are depicted in a "cocked" orientation in which opening blade 18 is retained in a blocking position against the bias of a spring 26 by a release latch 28 pivotable about a pin 30. Latch 28 is biased in the position shown by spring 32 attached to the camera housing so as to provide an appropriate latching contact with a pin 33 extending from the surface of blade 18. A reset bar 34 is rigidly attached to the end of blade 18 remote from the portion of the blade containing exposure orifice 22 and extends normally from the blade surface into the path of movement of closing blade 20. When the opening blade is held in blocking position by release latch 28, bar 34 is effective to engage blade 20 and to maintain the latter in the unblocking position shown against the bias of a spring means 36, which functions to urge the blade 20 toward its blocking position.

The manual depression of the tab of latch 28 causes its rotation about pin 30 and the movement of its latching portion away from pin 33. Thusly released, the opening blade 18 moves to the terminal position depicted in phantom at 18', its unblocking position. As blade 18 approaches its unblocking terminal position, a pin 38 extending normally from its forward surface engages a contact member 40 of triggering switch $S_4$ to cause it to bear against corresponding contact member 42 and close the switch. At the release of blade 18, latch 28 also causes the contact members 44 and 46 of a switch $S_1$ to close and the movement of the blade 18 will cause the opening of a normally closed switch $S_3$ by separation of its contact members 48 from a terminal block 50.

With the operational movement of opening blade 18 to position 18', an electromagnet 52 having a pole piece 54 will be selectively energized through leads as at 56 to retain the closing blade 20 in the unblocking position shown by virtue of its magnetic engagement with a keeper 58 mounted at the edge of blade 20. Following an exposure interval determined by a control circuitry to be described hereinafter, the electromaget 52 is deenergized to permit blade 20 to move to its blocking position shown in phantom at 20' under the urging of spring 36 to terminate an exposure.

Following an exposure cycle, blades 18 and 20 are returned to their cocked positions by a reset mechanism including a reset lever 60 maneuverable from a pin connection 62 with a manual reset actuator 64. Spring means 66 biases lever 60 to a normal position out of the path of movement of reset bar 34. A cocking movement of lever 60 will cause reset bar 34 to move both the opening blade 18 and closing blade 20 into an appropriate cocked position. Additional and more detailed description of the operation of this form of shutter will be found in a U.S. patent to Topaz, Pat. No. 3,326,103, entitled: "Auxilary Shutter Timing Mechanism."

Figure 2:
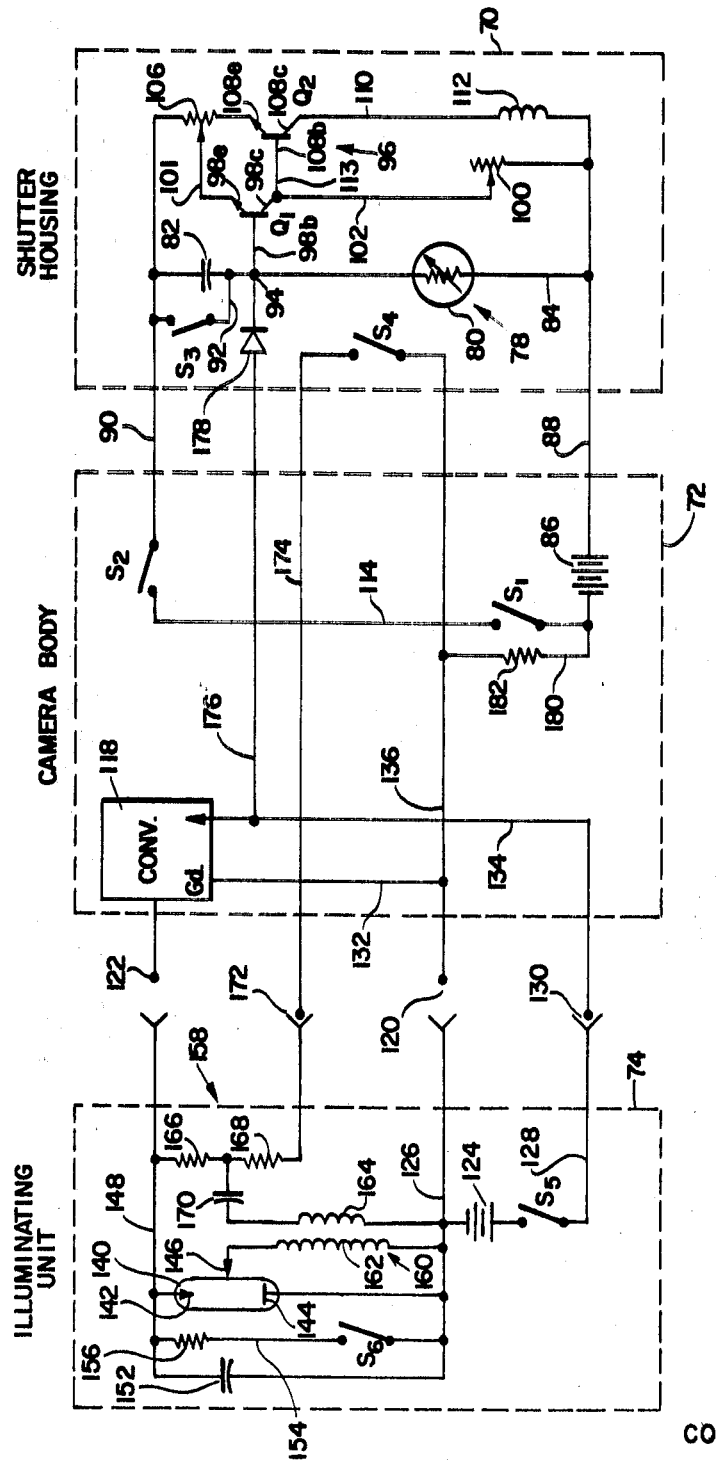
FIG. 2 is a schematic electrical diagram showing an embodiment of the present invention.

Referring to FIG. 2, the circuitry from which the shutter mechanism 10 may be controlled is illustrated. Component groupings of circuit functions associated with the basic components of a photographic camera adapted for exposure with electronic flash illumination are functionally delimited in the drawing by labels and dashed boundaries. These functions are seen to include a shutter housing area included within dashed line boundary 70, a camera body or housing portion outlined by dashed boundary 72 and an electronic flash or illuminating unit outlined within dashed boundary 74. The shutter housing boundary is shown to incorporate a light sensitive timing network depicted generally at 78 and including a photosensitive element such as a selenium photoconductor 80 and a capacitor 82 coupled in series with the photoconductor to form an R–C timing circuit along line 84. This timing network is powered by a battery 86 mounted within the camera body and having leads 88 and 90 extending to the timing circuit through their intersection with line 84. A bypass line 92 is arranged in shunt across the capacitor 82 and incorporates a normally closed switch $S_3$ which functions to reset the capacitor 82 between exposures. Photoconductor 80 is mounted upon the shutter housing in an orientation wherein it is responsive to the light levels of a scene being photographed. The element is characterized in having an electrical characteristic, for instance resistance, which varies in correspondence with scene light levels. Accordingly, the R–C combination of capacitor 82 with photoconductor 80 will evolve an output voltage signal at their common junction 94, the time dependent value of which will represent a function of scene light.

Timing network 78 operates in conjunction with a voltage sensitive triggering circuit shown generally at 96. The latter circuit has a normally nonconducting stage which includes a transistor $Q_1$ having base, collector and emitter electrodes $98b$, $98c$ and $98e$, respectively. Collector electrode $98c$ of transistor $Q_1$ is connected to line 88 of the shutter power source by variable bias resistor 100 through line 102. Emitter electrode $98e$ of transistor $Q_1$ is connected to line 90 of the power source through line 104 and a variable bias resistor 106. The normally conducting stage of circuit 96 includes transistor $Q_2$ having base, collector and emitter electrodes respectively at $108b$, $108c$ and $108e$. Collector electrode $108c$ is connected to power line 88 through line 110 and the coil of an electromagnet 112 so that the latter is energized when transistor $Q_2$ conducts. Base electrode $108b$ of transistor $Q_2$ is connected to the collector electrode $98c$ of transistor $Q_1$ through lead 113, and emitter electrode $108e$ of transistor $Q_2$ is connected through bias resistor 106 to power line 90. With this arrangement, there is essentially a common emitter resistor 106, the adjustment of which establishes a trigger voltage level for circuit 96. While the two stages of circuit 96 have been characterized as "normally-conducting" and "normally not-conducting," it should be understood that this characteristic is applicable only when a voltage is present across lines 88 and 90. The energizing circuit for both timing network 78 and trigger circuit 96 is completed upon the closure of power switch $S_1$ in line 114 and interlocking switch $S_2$ in line 90. The latter switch functions in conjunction with collapsible camera structures to assure that the circuit is deenergized during periods of stored nonusage.

Where the exposure control system thus far described is utilized in an ambient or normal outdoor lighting mode, an exposure is made by closing switches $S_1$ and $S_2$ thereby energizing the above described circuits. For convenience, the numeration of all such switches is made consistent where possible between FIGS. 1 and 2. The depression of latch 28 of FIG. 1 will effect a closing of switch $S_1$ and release opening blade 18 to its unblocking position 18'. The movement of blade 18, in turn, will open switch $S_3$ otherwise shunting capacitor 82, thereby permitting the light sensitive timing network 78 to commence to function. The closure of switch $S_1$ also causes the energization of the coil 112 of the electromagnet as at 52 in FIG. 1. Electromagnet 52, while thusly energized, retains closing blade 20 in an unblocking position. During this period, transistor $Q_2$ is conducting, base electrode $108b$ thereof having been gated from resistor 100 and line 90. Transistor $Q_2$ continues to conduct, thereby permitting the continued energization of the coil 112 of electromagnet 52, until the base electrode $98b$ of transistor $Q_1$ receives a triggering voltage from junction 94. This voltage will be received following an appropriate interval of exposure. As transistor $Q_1$ is triggered into conduction, the voltage at base $108b$ falls below its trigger level and coil 112 ceases to be energized. At that time, the shutter closing blade 20 is released and, as a consequence, the exposure interval is terminated as blade 20 moves to its blocking position. Those versed in the art will recognize that the common emitter coupling between transistors $Q_1$ and $Q_2$ in combination with resistor 106 forms a regenerative arrangement for improving the sensitivity of the triggering circuit.

Turning momentarily to FIG. 3, a representative trigger level for the trigger circuit 96 is depicted along horizontal line 116. For operation under typical outdoor illumination, the voltage buildup at junction 94 of the timing circuit 78 will follow a voltage-time characteristic similar to curve a. The exposure interval is considered to commence as the opening blade 18 reaches or approaches its full terminal position 18'. Consequently, a discrete amount of voltage buildup will be present as indicated within the area of the chart identified as "shutter opening interval" during which time the shutter is only partially open.

Where flash illumination is to be used in photographing a scene, the triggering characteristic desired for actuating the shutter mechanism 10 may vary in accordance with the particular photographic situation encountered. The exposure control system of the invention provides means for the voltage output signal of the timing network 78 to accommodate various situations as described in the discussion to follow.

An electronic flash producing circuit is depicted within the illuminating unit boundary 74 of FIG. 2. This circuit is connected to a high voltage source such as a battery operated converter 118 mounted within the confines 72 of a camera body. The positioning of such converters is optional to suit design needs. High voltage interconnection between the converter 118 and the flash circuit is made at releasable couplings 120 and 122. In the embodiment described converter 118 is powered by a rechargeable battery 124 mounted within the illuminating unit. Interconnection between battery 124 and the converter 118 is made along ground line 126 and line 128 through couplings 120 and 130 respectively into leads 132 and 134. A manually operable switch $S_5$ is also mounted with the illuminating unit to selectively disconnect lines 126 and 128 from both the camera body circuitry and the shutter housing circuitry. The illuminating unit includes a flash tube 140 having electrodes 142 and 144 which are disposed in a gaseous medium such as xenon within a transparent quartz envelope, and a trigger electrode 146. Electrodes 142 and 144 respectively are coupled across high voltage input terminal 148 and ground line 126 extending respectively to external couplings 122 and 120. Storage capacitor 152 connected across the high voltage input terminal 148 and ground line 126 powers the flash tube 140. A discharging shunt in line 154 is coupled in parallel with the line carrying capacitor 152 and includes a resistor 156 and a safety switch $S_6$ which automatically closes when the illuminating unit is removed from exposure position upon a camera body. It will be apparent that this shunt path 154 functions to remove any latent charge on capacitor 152 during periods of storage. Flash tube 140 is energized from a triggering circuit indicated generally at 158 and coupled with triggering electrode 146. Circuit 158 includes a triggering transformer 160, the secondary winding 162 of which is coupled between triggering electrode 146 and line 126 which, by virtue of its interconnection with rechargable battery 124, functions as the ground reference level for the illuminating unit and converter 118. The primary winding 164 of transformer 160 is connected to the junction between a current limiting resistor 166 and resistor 168 by capacitor 170. The other side of primary winding 164 is connected to ground line 126. Resistor 168 is connected with a releasable coupling 172 which, in turn, connects the triggering circuit 158 with a flash trigger switch $S_4$ such as that disclosed in connection with FIG. 1. Switch $S_4$ is positioned between lines 174 and 136.

When mounted upon a camera body so as to cause the automatic opening of safety switch $S_6$, the illuminating unit is energized upon the manual closure of switch $S_5$. This activity permits an appropriate voltage buildup in converter 118 which, in turn, develops a high voltage output supply between coupling terminals 122 and 120. The insertion of an energy source at lines 148 and 126 from the latter coupling terminals permits the charging of storage capacitor 152 to its operating potential. The voltage on capacitor 152 is not sufficient in itself to cause an electrical gaseous discharge through flash tube 140, except when the trigger electrode 146 is energized. At the same time the triggering capacitor 170 is precharged through resistor 166. The closure of switch $S_4$ as a consequence of the actuation of shutter opening blade 18 causes a triggering pulse to be applied to the primary winding 164 of triggering transformer 160. The transformer 160 accordingly applies a high voltage pulse to triggering electrode 146 of the flash tube 140 causing it to fire. During the triggering resistor 168, which is coupled in series with switch $S_4$, functions to soften or reduce high frequency components of the induced triggering pulse. An arrangement for mechanically coupling the illuminating unit to a camera body and simultaneously effecting the interconnection of proper leads at couplings 120, 122, 130 and 172 is described in the above referenced United States application for patent to Reed et al.

A further examination of the circuitry of the exposure control system, will reveal, in addition to the presence of two battery power sources 86 and 124, an interconnection between one terminal of the illuminating unit power source 124 and the light sensitive timing network 78. This interconnection is made along lead 176 extending between line 134 and junction 94 of network 78. Lead 176 also incorporates a unidirectional conducting means such as diode 178. By virtue of its selective coupling with a terminal connection of illuminating unit battery 124, diode 178 will permit a select amount of current to flow into the timing network 78 so as to cause a charging of capacitor 82 in supplement with that derived through photocell 80. This additive charging signal will alter the rate of voltage buildup at junction 94 to selectively adjust exposure interval. The circuit path through which the diode operates includes input line 176, junction 94, capacitor 82, line 90, switch $S_2$, line 114, switch $S_1$, and a line 180 containing a current limiting resistor 182. Resistor 182 is coupled with the illuminating unit ground reference line 126 by virtue of the latter's connection with line 136. Resistor 182 will be seen to separate the ground reference of the illuminating and converting unit from that of the timing network 78 and voltage sensitive triggering circuit 96. The resistor further functions to adjust the amount of current permitted to pass through diode 178 and therefore the charging at capacitor 82. The signal introduced through diode 178 commences to alter the charge on capacitor 82 with the opening of earlier described switch $S_3$.

Turning to FIG. 3, the effect of the signal introduced through diode 178 is graphically portrayed. In general, the light output from electronic flash tube 140 is of very short duration, for instance one millisecond, and consequently, for most photographic situations the response characteristics of photocell 80 will not permit a charging of capacitor 82 to sufficient voltage values to actuate trigger circuit 96 within a reasonable interval. By inserting the signal generated through diode 178 alone, without the influence of the contribution of the photosensing network, a voltage signal will be generated at junction 94 somewhat following the exemplary curve $b$ in the drawing. Note in this regard that the signal through diode 178 will cause the trigger level of the circuit 96 to be reached after about 22 milliseconds.

Where the subject matter of an exposure is illuminated from a relatively low ambient light and is situated in an environment having relatively low reflectivity, as is most often the case, the light sensitive portion of timing network 78, as a result of a pulse of flash illumination, will have a minor influence on the characteristic curve $b$ to slightly shorten the exposure interval as depicted by a curve $c$. Note that as the voltage buildup of curve $c$ progresses through the interval wherein light is generated from flash tube 140, a slight voltage rise is in evidence at 184. A light value versus time representation of such a light pulse is depicted in crosshatched fashion at 186.

Should a flash exposure be made in a situation wherein the surround of the subject being photographed is of a highly reflective nature, sufficient light may reach photocell 80 so as to permit a very rapid release of the closing blade 20. In such situations, the light values of the scene being photographed will dominate over the signal input through diode 178.

Fill-in flash photographic situations are frequently encountered wherein typical, adequate outdoor light levels are available, however, portions of the subject to be photographed are too dark. To illuminate these dark portions, it is desirable to energize the artificial light unit but permit the light sensitive timing network 78 to assume full control over exposure interval. This alternate exposure technique is available with the instant exposure control system. To operate the system in a fill-in flash mode, switches $S_5$ and $S_6$ are closed prior to an exposure and capacitors 152 and 170 are charged. Switch $S_5$ is then opened which, in turn, open circuits the input signal path into diode 178 from battery source 124. With switch $S_5$ open, the exposure mechanism is operated in the manner contemplated for conventional outdoor ambient light levels. A characteristic curve for such operation is shown in FIG. 3 at $d$. Note in the latter curve that throughout the flash interval, only a small voltage rise is experienced. During fill-in flash and normal ambient operation, diode 178 serves the additional function of preventing current back drain from the timing network and triggering circuitry into the contiguous converter circuitry. In a preferred arrangement, diode 178 is selected of a silicon variety having a low leakage characteristic.

Resistor 182, positioned between the dual reference levels of the exposure control system in addition to serving as a current limitor for diode 178 functions to protect the trigger circuit 96 from surges in voltage or current occasioned by the triggering of flash tube 140. It is important in this regard that the normally conducting stage including transistor $Q_2$ of circuit 96 remain conducting to energize coil 112 until an appropriate signal is received from the timing network 78.

Since certain changes may be made in the above exposure control system without departing from the scope of the invention herein involved, it is intended that all matter contained in the above description or shown in the accompanying drawings shall be interpreted as illustrative and not in a limiting sense.

What is claimed is:

1. An exposure control system for photographic apparatus comprising:
    artificial lighting means for providing flash illumination of a scene;
    a first power supply arranged to be electrically coupled with said lighting means for supplying electrical energy thereto;
    means defining an exposure aperture;
    shutter means for regulating the interval of exposure through said aperture;
    means coupled with said shutter means for initiating an exposure;
    light sensitive timing circuit means including at least one photosensitive element oriented with respect to a scene to be photographed and responsive to the light levels thereof for developing an output signal;
    triggering means responsive to the attainment by said output signal of a predetermined value for causing said shutter means to terminate an exposure;
    a second power supply electrically coupled with said timing circuit means and said triggering means for supplying electrical energy thereto; and
    means for electrically coupling said first power supply with said timing circuit during a said exposure interval to cause said triggering means to attain said predetermined signal value at least within a select interval of time.

2. The exposure control system of claim 1 including unidirectionally conductive means coupled within said electrically coupling means intermediate said timing circuit means and said first power supply for permitting current flow through said conductive means only into said timing circuit means from said first power supply.

3. The exposure control system of claim 2 wherein said unidirectionally conductive means comprises at least one diode.

4. The exposure control system of claim 1 in which:
    said artificial lighting means comprises at least one electrically fired gas discharge flash device; and
    including manually operable first switch means for selectively causing the conduction of electrical energy to said flash device and through said electrically coupling means from said first power source.

5. The exposure control system of claim 4 including unidirectionally conductive means coupled within said electrically coupling means intermediate said timing circuit means and first power supply for permitting current flow through said conductive means only into said timing circuit.

6. The exposure control system of claim 4 wherein said light sensitive timing circuit means includes capacitor means coupled in charging relationship with said photosensitive element.

7. The exposure control system of claim 1 wherein said electrically coupling means is operative to charge said capacitor means from said first power source simultaneously and in isolation from the charging relationship of said capacitor means with said photosensitive element.

8. The exposure control system of claim 4 including:
    second switch means operable in response to the actuation of said shutter means for firing said flash device; and
    third switch means for activating said timing circuit and said triggering means from said second power supply so as to permit the said charging of said capacitor means from said photosensitive element and from said first power supply through said electrically coupling means.

9. The exposure control system of claim 8 including unidirectionally conductive means coupled within said electrically coupling means intermediate said capacitor means and first power supply for permitting current flow through said conductive means only into said timing circuit.

10. An automatic exposure control system for photographic apparatus operable in ambient illumination mode and in a flash mode comprising:
    means defining an exposure aperture;
    shutter means for regulating the interval of exposure through said aperture;
    light sensitive timing circuit means including at least one photosensitive element oriented to receive light from a scene to be photographed, said circuit means responding to such light to develop an output signal;
    triggering means responsive to said output signal attaining a predetermined value for causing said shutter means to terminate exposure through said aperture;
    a first power supply arranged to be electrically coupled with said timing circuit means and said triggering means for supplying electrical energy thereto;
    artificial lighting means for providing flash illumination to said scene when said exposure control system is operating in said flash mode;
    a second power supply arranged to be electrically coupled with said lighting means for supplying electrical energy thereto; and
    means for electrically coupling said second power supply to said timing circuit means when the exposure control system is operating in the flash mode to alter the value of said output signal, thereby to control said exposure interval in accordance with a factor other than the ilumination of said photosensitive element.

11. The exposure control system of claim 10 including unidirectionally conductive means coupled within said electrically coupling means intermediate said timing circuit means and said second power supply for permitting current flow through said conductive means only into said timing circuit means from said second power supply.

12. The exposure control system of claim 11 wherein said unidirectionally conductive means comprises at least one diode.

13. An exposure control system for photographic apparatus comprising:
    artifical lighting unit means for providing flash illumination of a scene;
    a first power supply arranged to be electrically coupled in energy supplying relationship with said lighting unit means;
    means defining an exposure aperture;
    shutter means movable into light blocking and unblocking positions relative to said exposure aperture to effect an exposure;
    means coupled with said shutter means for initiating an exposure;
    at least one photoconductive element exposed to scene light and having an electrical parameter which varies in response to the intensity of light incident thereon;
    capacitor means coupled with said element and forming a timing circuit therewith having an output voltage signal responsive to said electrical parameter;
    voltage sensitive triggering means responsive to said output voltage signal reaching a predetermined value for causing said shutter means to terminate an exposure;

a second power supply including at least one battery electrically coupled with said timing circuit and said triggering means for supplying electrical energy thereto; and means for electrically coupling said first power supply with said timing circuit during a said exposure to cause said output voltage signal to attain said predetermined value at least within a select interval of time whereby said voltage sensitive trigger circuit causes said shutter means to terminate an exposure.

14. The exposure control system of claim 13 wherein said coupling means includes unidirectionally conductive means intermediate said first power supply and said timing circuit for permitting current flow through said coupling means only into said timing circuit from said first power supply.

15. The exposure control system of claim 14 wherein said unidirectionally conductive means comprises at least one diode.

16. The exposure control system of claim 15 including resistor means coupled in series with said diode and said capacitor means for selectively limiting said current input to said timing circuit from said first power supply.

17. The exposure control system of claim 16 wherein said resistor means is electrically coupled intermediate said first power supply and said second power supply so as to maintain the ground reference level of said voltage sensitive triggering means throughout a firing of said lighting unit means.

18. The exposure control system of claim 16 wherein said lighting unit means comprises an electronic flash device, mean for storing electrical energy and means for discharging said energy storing means through said electronic flash device to produce a flash of light in said flash device; and said first power supply includes a rechargeable battery and converter means coupled between said rechargeable battery and said energy by storing means for increasing the voltage input to said storage means.

19. The exposure control system of claim 18 including manually operable first switch means for selectively causing the conduction of electrical energy from said rechargeable battery into said coupling means whereby said photoconductive element may be operated to entirely control said timing circuit for fill-in flash exposures.

20. The exposure control system of claim 18 in which said second power supply is a battery.

21. An automatic exposure control system for photographic apparatus comprising:

an electronic flash device;

means for storing electric energy;

means to discharge said energy storing means through said electronic flash device for producing in said flash device a flash of scene illuminating light;

a first battery means for supplying said electric energy;

means defining an exposure aperture;

shutter means movable into light blocking and unblocking positions relative to said exposure aperture to effect an exposure;

means coupled with said shutter means for initiating an exposure and actuating said flash device discharge means.

at least one photoconductive element exposed to scene light and having an electrical parameter which varies in response to the intensity of light incident thereon;

capacitor means coupled with said element and forming a timing circuit therewith having an output voltage signal responsive to said electrical parameter;

voltage sensitive triggering means responsive to said output voltage signal reaching a predetermined value for causing said shutter means to terminate an exposure;

second battery means electrically coupled with said timing circuit and said triggering means for supplying electrical energy thereto;

conductor means coupling said first battery means in charging relationship with said capacitor means for causing said capacitor means to charge to said predetermined value at least within a select interval of time; and unidirectionally conductive means coupled with said conductor means for permitting current flow through said conductor means only from said first battery means.

22. The exposure control system of claim 21 wherein said unidirectionally conductive means comprises at least one diode.

23. The exposure control system of claim 21 including resistor means coupled in series with said conductor means for selectively limiting any current input to said capacitor means from said first battery means.

24. The exposure control system of claim 23 wherein said resistor means is electrically coupled intermediate said first battery means and said second battery means so as to maintain the ground reference level of said voltage sensitive triggering means throughout a firing of said flash device.

25. The exposure control system of claim 24 including manually operable first switch means mounted with said electronic flash device for selectively causing the conduction of electrical energy from said first battery means into said conductor means whereby said photoconductive element may optionally function to entirely regulate said timing circuit for fill-in flash exposures.

26. The exposure control system of claim 15 including resistor means selectively connectable with said first power supply and said means for electrically coupling said first power supply with said timing circuit for selectively limiting said current input to said timing circuit from said first power supply.

References Cited
UNITED STATES PATENTS

| | | | |
|---|---|---|---|
| 3,418,904 | 12/1968 | Wick et al. | 95—53 EB |
| 3,507,196 | 4/1970 | Ruhle et al. | 95—11.5 R |

SAMUEL S. MATTHEWS, Primary Examiner

R. E. ADAMS, JR., Assistant Examiner

U.S. Cl. X.R.

95—11 L, 11.5, 53 EB